United States Patent
Oami et al.

(10) Patent No.: US 9,495,754 B2
(45) Date of Patent: Nov. 15, 2016

(54) PERSON CLOTHING FEATURE EXTRACTION DEVICE, PERSON SEARCH DEVICE, AND PROCESSING METHOD THEREOF

(71) Applicants: Ryoma Oami, Minato-ku (JP);
Yasufumi Hirakawa, Minato-ku (JP);
Yusuke Takahashi, Minato-ku (JP)

(72) Inventors: Ryoma Oami, Minato-ku (JP);
Yasufumi Hirakawa, Minato-ku (JP);
Yusuke Takahashi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/508,477

(22) Filed: Oct. 7, 2014

(65) Prior Publication Data

US 2015/0023596 A1    Jan. 22, 2015

Related U.S. Application Data

(62) Division of application No. 13/501,647, filed as application No. PCT/JP2010/067914 on Oct. 13, 2010, now Pat. No. 8,891,880.

(30) Foreign Application Priority Data

Oct. 16, 2009    (JP) .................. 2009-239360

(51) Int. Cl.
*G06K 9/46* (2006.01)
*G06T 7/00* (2006.01)
(Continued)

(52) U.S. Cl.
CPC ....... *G06T 7/0081* (2013.01); *G06F 17/30244* (2013.01); *G06K 9/00362* (2013.01); *G06K 9/00771* (2013.01); *G06T 2207/20141* (2013.01); *G06T 2210/16* (2013.01)

(58) Field of Classification Search
CPC ............. G06K 9/6211; G06K 9/4652; G06K 9/00362; G06K 9/00771; G06K 9/38; G06T 7/40; G06T 7/0081; G06T 2210/16; G06T 2207/20141; G06T 7/0083; G06T 2207/10016; G06F 17/30244
USPC ........ 382/100, 103, 115–118, 162, 164, 165, 382/173, 181, 195, 199, 218–220
See application file for complete search history.

(56) References Cited

U.S. PATENT DOCUMENTS 7,668,367 B2    2/2010  Living
7,783,135 B2 *  8/2010  Gokturk et al. .............. 382/305
(Continued)

FOREIGN PATENT DOCUMENTS

CN    1499816 A    5/2004
CN    1892702 A    1/2007
(Continued)

OTHER PUBLICATIONS

Gallagher, AC.; Tsuhan Chen, discloses "Clothing cosegmentation for recognizing people," Computer Vision and Pattern Recognition, 2008. CVPR 2008. IEEE Conference on , vol., No., pp. 1,8, Jun. 23-28, 2008.*
(Continued)

*Primary Examiner* — Sheela C Chawan
(74) *Attorney, Agent, or Firm* — Sughrue Mion, PLLC

(57) ABSTRACT

A person's region is detected from input video of a surveillance camera; a person's direction in the person's region is determined; the separability of person's clothes is determined to generate clothing segment separation information; furthermore, clothing features representing visual features of person's clothes in the person's region are extracted in consideration of the person's direction and the clothing segment separation information. The person's direction is determined based on a person's face direction, person's motion, and clothing symmetry. The clothing segment separation information is generated based on analysis information regarding a geometrical shape of the person's region and visual segment information representing person's clothing segments which are visible based on the person's region and background prior information. A person is searched out based on a result of matching between a clothing query text, representing a type and a color of person's clothes, and the extracted person's clothing features.

9 Claims, 10 Drawing Sheets

(51) Int. Cl.
*G06K 9/00* (2006.01)
*G06F 17/30* (2006.01)

(56) References Cited

U.S. PATENT DOCUMENTS

| | | | |
|---|---|---|---|
| 8,036,416 B2* | 10/2011 | Matsumoto et al. | 382/100 |
| 8,150,098 B2* | 4/2012 | Gallagher et al. | 382/100 |
| 8,180,112 B2* | 5/2012 | Kurtz | G06K 9/00288 382/103 |
| 8,270,709 B2 | 9/2012 | Lindbloom | |
| 8,306,281 B2 | 11/2012 | Matsubara et al. | |
| 8,379,920 B2 | 2/2013 | Yang et al. | |
| 2006/0159370 A1 | 7/2006 | Tanaka et al. | |
| 2008/0056564 A1 | 3/2008 | Lindbloom | |
| 2008/0064333 A1* | 3/2008 | Hymes | 455/41.2 |
| 2008/0212899 A1 | 9/2008 | Gokturk et al. | |
| 2009/0058615 A1* | 3/2009 | Schultz | G01S 19/14 340/10.4 |
| 2009/0141940 A1 | 6/2009 | Zhao et al. | |
| 2009/0296989 A1 | 12/2009 | Ramesh et al. | |
| 2011/0274314 A1 | 11/2011 | Yang et al. | |

FOREIGN PATENT DOCUMENTS

| | | |
|---|---|---|
| CN | 101236599 A | 8/2008 |
| JP | 2000-030033 A | 1/2000 |
| JP | 2005-202938 A | 7/2005 |
| JP | 2008-139941 A | 6/2008 |
| JP | 2008-165700 A | 7/2008 |
| JP | 2009-003581 A | 1/2009 |
| JP | 2009-110460 A | 5/2009 |
| JP | 2009-199322 A | 9/2009 |

OTHER PUBLICATIONS

Sato, Masaaki, et al., "Person Search System using Face and Clothing Features," Matsushita Technical Journal, Jun. 2006, pp. 67-71, vol. 52, No. 3.

Office Action, dated Feb. 8, 2014, issued by the State Intellectual Property Office of the People's Republic of China, in counterpart Application No. 201080045981.1.

AC Gallagher et al., "Clothing cosegmentation for recognizing people," IEEE Conference on Computer Vision and Pattern Recognition, Jun. 2008, pp. 1, 8, 23-28.

* cited by examiner

PERSON CLOTHING FEATURE EXTRACTION DEVICE, PERSON SEARCH DEVICE, AND PROCESSING METHOD THEREOF

This is a divisional application based upon U.S. patent application Ser. No. 13/501,647 filed Apr. 12, 2012, which is a National Stage of International Application No. PCT/JP2010/067914 filed Oct. 13, 2010, claiming priority based on Japanese Patent Application No. 2009-239360 filed Oct. 16, 2009, the contents of all of which are incorporated herein by reference in their entirety.

TECHNICAL FIELD

The present invention relates to a person clothing feature extraction device that extracts person clothing features from input video. Additionally, the present invention relates to a person search device that searches for persons based on person clothing features extracted from input video. Furthermore, the present invention relates to a person clothing feature extraction processing method and a person search processing method.

BACKGROUND ART

Conventionally, a variety of person search methods, surveillance systems, and image storing/search systems has been developed. PLT 1 disclosed a person search method that searches for persons based on stored video in a surveillance system. When recording video, the surveillance system extracts information, regarding person's faces and clothes, so as to store information in a database. When searching persons, the surveillance system compares face/clothing features of an image given as a query with face/clothing features stored in the database so as to determine whether or not they indicate the same person.

A person search system disclosed in PLT 1 will be described in detail with reference to FIG. 10. FIG. 10 shows the constitution of a person search device, which includes face region detection/face feature extraction parts 1000, 1020, clothing region detection/clothing feature extraction parts 1010, 1030, a clothing feature database 1040, a face feature database 1050, a face similarity calculation part 1060, a clothing similarity calculation part 1070, and a person identity determination part 1080.

The face region detection/face feature extraction part 1000 detects a face region so as to extract face features based on video captured by the surveillance system, thus sending extracted face features to the face feature database 1050. The clothing region detection/clothing feature extraction part 1010 detects a clothing region so as to extract clothing features based on video captured by the surveillance system, thus sending extracted clothing features to the clothing feature database 1040. On the other hand, the face region detection/face feature extraction part 1020 detects a face region so as to extract face features from a query image, thus sending query face features to the clothing similarity calculation part 1070. The face similarity calculation part 1060 compares query face features, received from the face region detection/face feature extraction part 1020, with face features stored in the face feature database 1050, thus calculating and sending a face similarity to the person identity determination part 1080. The clothing similarity calculation part 1070 compares query clothing features, received from the clothing region detection/clothing feature extraction part 1030, with clothing features stored in the clothing feature database 1040, thus calculating and sending a clothing similarity to the person identity determination part 1080. The person identity determination part 1080 determines person identity based on a face similarity calculated by the face similarity calculation part 1060 and a clothing similarity calculated by the clothing similarity calculation part 1070, thus producing a person search result.

Next, the operation of the person search device shown in FIG. 10 will be described. First, video captured by the surveillance system is input into the face region detection/face feature extraction part 1000 and the clothing region detection/clothing feature extraction part 1010. The face region detection/face feature extraction part 1000 detects a face region per each frame of input video so as to extract face features from the detected face region. Face features which are extracted from a face region detected from input video are stored in the face feature database 1050.

The clothing region detection/clothing feature extraction part 1010 detects a clothing region from input video so as to extract its visual features, i.e. clothing features. Extracted clothing features are stored in the clothing feature database 1040.

In case of person searching, a query image is input into the face region detection/face feature extraction part 1020 and the clothing region detection/clothing feature extraction part 1030. The face region detection/face feature extraction part 1020 and the clothing region detection/clothing feature extraction part 1030 function similarly to the face region detection/face feature extraction part 1000 and the clothing region detection/clothing feature extraction part 1010 so as to extract query face features and query clothing features.

The face similarity calculation part 1060 compares query face features with face features stored in the face feature database 1050 so as to calculate a face similarity. On the other hand, the clothing similarity calculation part 1070 compares query clothing features with clothing features stored in the clothing feature database 1040 so as to calculate a clothing similarity. The person identity determination part 1080 integrates a face similarity with a clothing similarity so as to determine person identity, thus producing a person search result.

PLT 2 disclosed an image storing/search system that searches for image data including image features equivalent to color sensation languages representing coloring which humans may subjectively sense. Herein, it is necessary to preset a correlation between color expressions, included in human natural languages, and images in a color space. Additionally, it is necessary to extract pixels from image data stored in a database, calculate similarities with color expressions, and save them in memory. Provided a color expression as a query, this system checks similarities of image data with color expressions so as to search and display image data with a high similarity.

CITATION LIST

Patent Literature

PLT 1: Japanese Patent Application Publication No. 2009-199322
PLT 2: Japanese Patent Application Publication No. 2009-3581

SUMMARY OF INVENTION

Technical Problem

The person search system shown in FIG. 10 is designed to solely accept query images but unable to search for persons based on query texts. That is, this system extracts visual features (e.g. information regarding colors and patterns of clothes) from query images so as to search for persons, but this system is unable to convert query texts, representing language expressions such as "red clothes", into visual features and thereby search for persons. Additionally, this system does not consider a person's direction when detecting a clothing region from input video, so that this system is unable to consider differences of manners how clothes are viewed due to differences of person's directions. Furthermore, this system extracts visual features from the entire clothing region, but this system is unable to reflect differences of clothes between the upper part and the lower part of a person's body into person searching when different visual features are found between the upper part and the lower part of a person's body wearing "a white jacket and blue trousers". For this reason, even when a searcher intends to search for a person who turns his/her body in a front direction, this system is likely to produce a search result indicating another person. Additionally, even when a searcher intends to search for a person based on his/her clothes in the upper part of his/her body, this system is likely to search another person with a similarity of visual features regarding clothes worn by another body part other than the upper part of his/her body. As described above, the conventional person search system may produce person search results including numerous errors.

The image storing/search system disclosed in PLT 2 is able to search for persons based on a query text representing a single color of clothes such as "red clothes", but this system is unable to search for persons by use of multiple colors since its query text is able to simply designate a single color. Similar to PLT 1, this system is unable to reflect differences of person's directions and differences of visual features, found between the upper part and the lower part of a person's body, into person search results.

Solution to Problem

The present invention is made in consideration of the aforementioned circumstances, wherein the present invention provides a person clothing feature extraction device which is able to extract clothing features of person's clothes included in video.

Additionally, the present invention provides a person search device which searches for persons upon comparison between a query text and person's clothing features detected from video.

Furthermore, the present invention provides programs describing a person clothing feature extraction processing method and a person search processing method.

A person clothing feature extraction device of the present invention includes a person region detection part that detects a person's region from input video; a person direction determination part that determines a person's direction in the person's region; a clothing segment separation part that determines the separability of person's clothes in the person's region so as to produce clothing segment separation information; a clothing feature extraction part that extracts clothing features representing visual features of person's clothes in the person's region in consideration of the person's direction and the clothing segment separation information; and a clothing feature storage that stores the extracted clothing features.

A person search device of the present invention includes a clothing information extraction part that extracts clothing feature parameters based on a clothing query text representing a type and a color of person's clothes; a clothing feature query generation part that generates a clothing feature query based on clothing feature parameters; a clothing feature matching part that compares the clothing feature query with clothing features retrieved from a clothing feature storage, thus producing its matching result; and a person search part that produces a person search result based on the matching result.

A person clothing feature extraction method of the present invention executes a person region detecting process for detecting a person's region from input video; a person direction determining process for determining a person's direction in the person's region; a person clothing segment separation process for determining the separability of person's clothes in the person's region so as to produce clothing segment separation information; and a clothing feature extracting process for extracting clothing features representing visual features of person's clothes in the person's region in consideration of the person's direction and the clothing segment separation information.

A person search method of the present invention executes a clothing information extracting process for extracting clothing feature parameters based on a clothing query text representing a type and a color of person's clothes; a clothing feature query generating process for generating a clothing feature query based on clothing feature parameters; a clothing feature matching process for comparing the clothing feature query with clothing features retrieved from a clothing feature storage; and a person search process for producing a person search result based on a matching result.

The present invention provides a program describing the foregoing clothing feature extraction method in a computer-readable/executable format. Additionally, the present invention provides a program describing the foregoing person search method in a computer-readable/executable format.

Advantageous Effects of Invention

The present invention aims to detect a person's region from video captured by a surveillance camera or the like, accurately extract clothing features of a person who exists in the person's region, and thereby produce a person search result precisely reflecting a searcher's intention based on extracted clothing features of a person.

DESCRIPTION OF EMBODIMENTS

An embodiment of the present invention will be described in detail with reference to the accompanying drawings.

Figure 1:
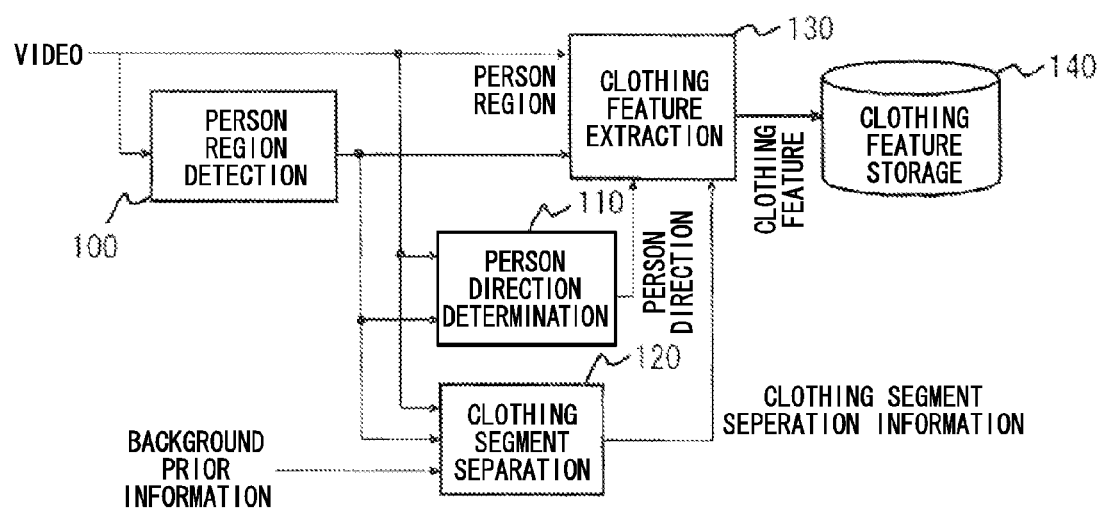
FIG. 1 A block diagram showing the constitution of a person clothing feature extraction device according to an embodiment of the present invention.

FIG. 1 is a block diagram showing the constitution of a person clothing feature extraction device according to the present embodiment. The person clothing feature extraction device includes a person region detection part 100, a person direction determination part 110, a clothing segment separation part 120, and a clothing feature extraction part 130, and a clothing feature storage 140.

The person clothing feature extraction device is realized by installing a person clothing feature extraction program in a computer configured of a CPU, a ROM, and a RAM. The person clothing feature extraction program (or an information collection program) can be stored in various storage media, or they can be transferred via communication media. Storage media may encompass flexible disks, hard disks, magnetic disks, magneto-optic disks, CD-ROM, DVD, ROM cartridges, battery-backup RAM cartridges, flash memory cartridges, and nonvolatile RAM cartridges. Communication media may encompass wired communication media such as telephone lines, radio communication media such as microwave lines, and the Internet.

The person region detection part 100 detects a person's region that exists in input video. A person's region detected from input video is supplied to the person direction determination part 110, the clothing segment separation part 120, and the clothing feature extraction part 130. The person direction determination part 110 determines a person's direction in a person's region of input video so as to send it to the clothing feature extraction part 130. The clothing segment separation part 120 determines whether or not clothes of a person who exists in a person's region of input video can be separated into segments, thus providing clothing segment separation information to the clothing feature extraction part 130. Specifically, it calculates clothing segment separation information based on background prior information and a person's region of input video so as to send clothing segment separation information to the clothing feature extraction part 130. The clothing feature extraction part 130 extracts visual information of person's clothes based on a person's region of input video, a person's direction, and clothing segment separation information, thus sending visual information to the clothing feature storage 140. In other words, it extracts person's clothing features from a person's region of input video, a person's direction, and clothing segment separation information, thus sending them to the clothing feature storage 140. The clothing feature storage 140 receives and stores person's clothing features from the clothing feature extraction part 130.

Next, the operation of the person clothing feature extraction device shown in FIG. 1 will be described in detail. The person region detection part 100 receives desired video as an image subjected to processing, wherein it can accept image data of a predetermined compression format or image data of a non-compression format after decoding. As the compression format, it is possible to employ an MPEG-2 (Moving Picture Expert Group) format or an H.264 format (or an MPEG-4 format). Image data of a compression format are subjected to decoding and then received in units of frames or in units of fields. The following description refers to input video aggregated in units of frames, but it is possible to achieve the same image processing by use of input video aggregated in units of fields. As a color format of input video, it is possible to employ a YUV format, an RGB format, or other expression formats of a color space.

The person region detection part 100 detects a person's region per each frame of input video. As a person region detection processing method, it is possible to employ various methods. For instance, a difference between input video and pre-captured background image (hereinafter, referred to as a "differential image") is calculated and subjected to execution of a threshold process, thus extracting only the person's region from input video. It is possible to extract a differential image, representing a difference between input video and background image, for each frame. Alternatively, each frame is divided into a plurality of subdivisions, so that it is possible to extract a differential image for each subdivision. That is, it is possible to make a decision as to existence/nonexistence of an individual animal (i.e. an animal other than a person) for each subdivision of each frame of input video, and subsequently calculate a difference between background image and video demonstrating nonexistence of an individual animal, thus extracting a person's region. Additionally, it is possible to uniformly set a threshold, which is used for a threshold process executed on a differential image, over the entire screen. Alternatively, it is possible to adaptively set a threshold over each area on a screen. For instance, it is possible to increase a threshold with respect to an area undergoing high variations of information over time on a screen, while it is possible to decrease a threshold with respect to a stable area undergoing small variations of information over time on a screen.

Person's regions extracted from input video are grouped into neighboring areas, wherein an individual ID (identification information) is assigned to each group, so that a person's region corresponds to an area specified by each ID. As a depicting method of each person's region, it is possible to employ various methods. For instance, it is possible to calculate mask information representing two-dimensional information assigned with a specific value which differs from a value representing background of an area specified by each ID. The calculated person's region is sent to the person direction determination part 110 together with input video.

The person direction determination part 110 determines a person's direction based on a person's region and input video. A person's direction is determined based on a face direction, a person's motion direction, and symmetry of person's clothes. This is because a person's direction exhibits a high correlation to a face direction and a person's motion. Generally speaking, clothes may frequently exhibit right/left symmetrical patterns; hence, symmetry of clothes can be used to determine whether or not a person turns his/her body in a front direction. These pieces of information are used to determine the direction of a person who exists in a person's region in input video. Details of information used for determining a person's direction will be described later. It is unnecessary to use all the face direction, the person's motion direction, and the symmetry of clothes in determining a person's direction; hence, it is possible to determine a person's direction based on at least one of these pieces of information. Herein, a person's direction is calculated per each area specified by each ID. For instance, a person's direction is calculated with respect to three segments, namely a front direction, a rear direction, and an indeterminate direction (i.e. an indeterminate direction of a person). The calculated person's direction is supplied to the closing feature extraction part 130. In this connection, a person's direction is not necessarily limited to three segments, namely a front direction, a rear direction, and an indeterminate direction; hence, a person's direction can be classified into four or more segments.

The clothing segment separation part 120 receives a person's region, background prior information, and input video. The clothing segment separation part 120 separates person's clothes into a plurality of segments based on these pieces of information.

The background prior information is information representing a manner how a person is viewed depending on a position in the background of a person's region. For instance, when an obstacle such as a desk and a shelf exists in a viewing scope of a camera and comes in contact with the lower end of a person's region, it is considered that a part of a person (e.g. the upper part of a body) may be visible in the background prior information. Thus, a floor which exists in a viewing scope of a camera is marked as background prior information indicating that the entirety of a person may be visible, whilst the upper end of an obstacle is marked as background prior information indicating that a part of a person (e.g. the upper part of a body) may be visible. In case of a surveillance camera with a fixed viewing scope, it is necessary to capture background prior information at once. As a method of capturing background prior information, a surveyor may manually mark background prior information and capture the information. With a surveillance camera whose viewing scope is adaptable to a plurality of fixed positions, a surveyor may manually mark background prior information and capture the information at each fixed position. With a surveillance camera whose viewing scope is continuously varied, a surveyor may temporarily mark background prior information and capture the information, so that background prior information will be automatically changed to follow the motion of a surveillance camera. Specifically, a conventionally-known feature point extraction method is adopted to automatically extract feature points such as corners of a desk or a shelf, so that feature points which are moving in a viewing scope to follow the motion of a camera are correlated to each other between frames, thus keeping track of the movement of a person's region in each background prior information.

The clothing feature extraction part 130 extracts visual features in a person's region with respect to each segment of a person based on input video, a person's region of the person region detection part 100, and clothing segment separation information of the clothing segment separation part 120.

When clothing segment separation information represents separation between the upper part and the lower part of a person's image and indicates its separation position, for example, it is possible to extract visual features regarding the upper part of a body from the upper area above the separation position while extracting visual features regarding the lower part of a body from the lower area below the separation position in a person's region. Alternatively, it is possible to determine segments such as a face and legs of a person from the upper part and the lower part of a body in a person's region, thus extracting visual features precluding those segments. Thus, visual features extracted from a person's region are correlated to segments of a person. For instance, visual features regarding the upper part of a body are provided in combination with an index representing the upper part of a person's body. Additionally, they can be provided together with a person's direction of the person direction determination part 110. In case of a person's direction corresponding to his/her front direction, for example, visual features are provided together with an index representing the front direction. In case of a person's direction corresponding to his/her rear direction (or his/her side direction), visual features are provided together with an index representing the rear direction (or the side direction). In case of a person's direction corresponding to an indeterminable direction, visual features are provided together with an index representing the indeterminable direction (e.g. an index having a specific value).

Visual features represent colors and textures of persons' clothes. Using visual features, expressed in an HSV color space, pixel data of a person's region are converted into Hue, Saturation, and Value, which are further subjected to quantization to produce an HSV histogram. In case of visual features representing designated colors for use in Dominant Color Descriptor of MPEG-7 specified in ISO/IEC 15938-3, a person's region is divided into color divisions, so that a dominant color is searched through each division so as to determine visual features. Other than this method, it is possible to use various visual features representing colors for use in a color layout of MPEG-7. When an edge histogram is used as representation of visual features regarding patterns, an edge is detected in each direction of a person's region so as to produce an edge histogram. In case of visual features based on a Wavelet method, a person's region is subjected to Wavelet conversion to produce Wavelet coefficients. Wavelet coefficients or statics (i.e. an average, variance, etc. among Wavelet coefficients in its directional component) are used as visual features. Moreover, it is possible to use various visual features regarding patterns for use in Homogeneous Texture of MPEG-7. In this connection, visual features do not necessarily contain both of color elements and pattern elements; hence, they may contain one of color elements and pattern elements. Furthermore, visual features may contain elements other than color elements and pattern elements.

Figure 6:
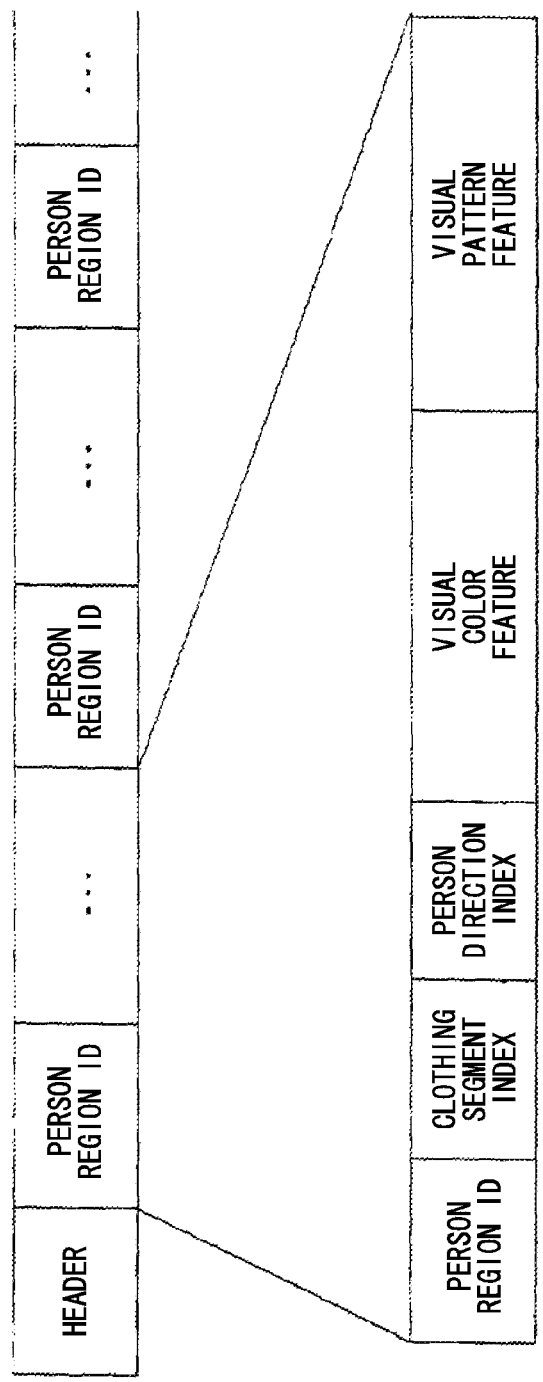
FIG. 6 An illustration indicative of an example of a storage format of visual features representing person clothing features.

Visual features regarding person's clothes, which are extracted by the foregoing method, are stored in the clothing feature storage 140 as clothing features. As a storage format of clothing features, it is possible to employ various formats. For instance, input video is divided into temporal units with a fixed time lengths, so that clothing features are stored in files in temporal units. Alternatively, video of a short recording time is stored in files in units of images. FIG. 6 shows an example of a storage format of visual features. Herein, header information is followed by visual features which are sequentially stored with respect to each person's region. A person's region ID, a clothing segment index, a person direction index, color-related visual features, and pattern-related visual features are sequentially stored with respect to each person's region. In this connection, the storage format of visual features is not necessarily limited to the format of FIG. 6; hence, it is possible to employ any format which can univocally specify each person's region.

Figure 5:
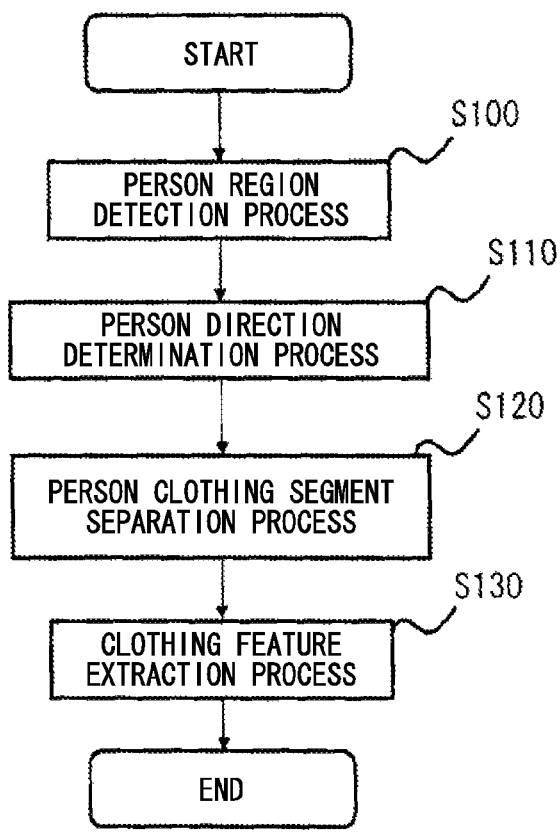
FIG. 5 A flowchart showing the processing of the person clothing feature extraction device.

Next, the operation of the person clothing feature extraction device shown in FIG. 1 will be described in detail. FIG. 5 is a flowchart showing the entire processing of the person clothing feature extraction device. First, the person region detection part 100 detects a person's region per each frame from input video (step S100). Next, the person direction determination part 110 determines a person's direction in a person's region (step S110). Details of this process will be described later. Next, the clothing segment separation part 120 separates person's clothes into a plurality of segments (step S120). Details of this process will be described later. Next, the clothing feature extraction part 130 extracts person's clothing features (step S130). In this connection, steps S110 and S120 can be reversed in their order.

The person clothing feature extraction device extracts and stores clothing features based on a person's direction and separability of clothing segments. For this reason, it is possible to provide information (i.e. clothing feature information) which makes it possible to search for clothes having different visual features with respect to each person's direction and each clothing segment.

Figure 3:
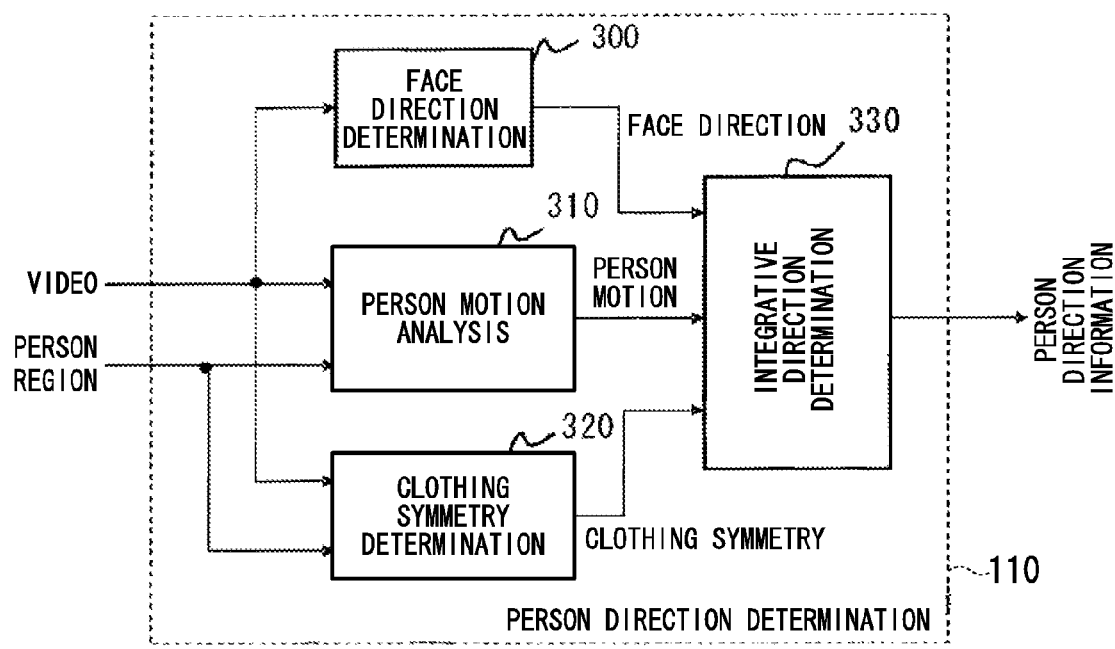
FIG. 3 A block diagram showing the internal constitution of a person direction determination part.

Next, the operation of the person direction determination part 110 of the person clothing feature extraction device will be described in detail. FIG. 3 is a block diagram showing the internal constitution of the person direction determination part 110. The person direction determination part 110 includes a face direction determination part 300, a person motion analysis part 310, a clothing symmetry determination part 320, and an integrative direction determination part 330.

The face direction determination part 300 determines a person's face direction based on input video, thus providing its determination result to the integrative direction determination part 330. The person motion analysis part 310 analyzes person's motion based on input video and a person's region, thus providing its determination result to the integrative direction determination part 330. The clothing symmetry determination part 320 determines clothing symmetry based on input video and a person's region, thus providing its determination result to the integrative direction determination part 330. The integrative direction determination part 330 determines a person's direction based on a person's face direction, a person's motion, and clothing symmetry.

Next, the operation of the person direction determination part 110 will be described in detail. The face direction determination part 300 detects a person's face region per each frame of input video while estimating a face direction. As a method of detecting a person's face region and estimating a face direction, it is possible to employ various methods. When a plurality of persons' faces is detected in each frame of input video, it is necessary to estimate each person's face direction. Information regarding a person's face direction is a set of face positions and directions (particularly, left/right directions) which are collected with respect to each person's face. If no person's face is detected in input video, it is necessary to provide information indicating that no person's face is detected. To detect a person's face region and estimate a face direction, it is necessary to calculate a reliability representing detection/estimation certainty, which is attached to information regarding a person's face direction. A person's face direction, which is determined as described above, is supplied to the integrative direction determination part 330.

The person motion analysis part 310 analyzes movement of a person's region based on time-series information pertaining to input video and a person's region. For instance, it is possible to estimate movement of a person's region by detecting feature points per each frame in a person's region and tracking them between frames. Alternatively, it is possible to estimate movement of a person's region by calculating a centroid point of a person's region per each frame and tracking its movement. In this case, it is possible to estimate movement of a person's region based on two frames which occur sequentially in time series. Alternatively, it is possible to estimate movement of a person's region based on numerous frames. With respect to relatively small movement of a person's region, it is necessary to calculate an optical flow between frames, thus estimating movement of a person's region based on the optical flow. In this case, it is possible to calculate an average among optical flows between pixels in a person's region and perform a nonlinear static process such as median, thus estimating movement of a person's region. The estimated movement of a person's region (i.e. a person motion) is supplied to the integrative direction determination part 330.

The clothing symmetry determination part 320 determines clothing symmetry based on input video and a person's region. As a method of determining clothing symmetry, it is possible to propose various methods. For instance, it is possible to check whether or not a pixel function, which can be produced by scanning pixels in a person's region in a horizontal direction, exhibits symmetry about an axis proximate to the center of a person's region. Specifically, it is necessary to calculate symmetry deviation according to Equation 1.

$$D_s(y) = \min_u \frac{\sum_{x=0}^{W} |I(u-x, y) - I(u+x, y)|^2 M(u-x, y)M(u+x, y)}{\sum_{x=0}^{W} M(u-x, y)M(u+x, y)}$$ [Equation 1]

Herein, I(x,y) denotes pixel data (i.e. a three-dimensional vector in a color space R, G, B) at coordinates (x,y). M(x,y) denotes mask information representing a person's region, wherein it is set to "1" when coordinates (x,y) represent a person's region, otherwise, it is set to "0". W is a constant, and u is set to a value representing proximity to the center of a person's region. Equation 1 produces $D_s(y)$ per each value of y as a minimum value of symmetry deviation when the center of a person's region is moved (i.e. when a value of u is varied). The symmetry deviation $D_s(y)$, which is calculated as described above, is averaged between an upper end $y=Y_0$ and a lower end $y=Y_1$ in a person's region in accordance with Equation 2, thus calculating an average distortion of symmetry.

$$\overline{D_s} = \frac{1}{Y_1 - Y_0} \sum_{y=Y_0}^{Y_1} D_s(y)$$ [Equation 2]

It is possible to presume the situation where uniform pixel data appear in a viewing scope so as to increase symmetry regardless of directions; hence, it is necessary to concurrently check flatness of pixel data, whereby it is necessary to determine a low reliability in calculating high symmetry deviation when pixel data exhibit high flatness. For this reason, it is necessary to calculate flatness of pixel data for each scanning line in a horizontal direction in accordance with Equation 3 (i.e. a left end $x=X_0$ and a right end $x=X_1$ in a person's region) and then average it between the upper end $y=Y_0$ and the lower end $y=Y_1$ in a person's region in accordance with Equation 4, thus calculating an average distortion of symmetry.

$$D_f(y) = \sum_{x=X_0}^{X_1} (I(x, y) - \overline{I(x, y)})^2 M(x, y)$$ [Equation 3]

$$\overline{D_f} = \frac{1}{Y_1 - Y_0} \sum_{y=Y_0}^{Y_1} D_f(y)$$ [Equation 4]

Herein, I(x,y) with bar denotes an average of pixel data which can be obtained by scanning in a horizontal direction while fixing y. $D_s$ with bar and $D_f$ with bar, which are calculated as described above, are supplied to the integrative direction determination part 330 as clothing symmetry. Alternatively, it is possible to provide functional values regarding symmetry and flatness, which are expressed in Equation 1 and Equation 3, as clothing symmetry.

The integrative direction determination part 330 determines a person's integrative direction based on a person's face direction, person's motion, and clothing symmetry in a person's region. Herein, it is possible to employ various methods. For instance, it is possible to calculate scores in a front direction (hereinafter, referred to as "frontality scores") with respect to a person's face direction, person's motion, and clothing symmetry, so that a person's direction is determined by integrating those scores. In this case, it is possible to directly use a person's face direction as a frontality score.

As to person's motion, it is possible to calculate the similarity between the calculated motion vector and a downward vector, thus estimating in which direction a person is currently moving (or walking). For instance, it is possible to calculate a cosine value between a motion vector and a downward vector, thus estimating a person's direction based on the cosine value. Herein, a cosine value of "−1" is calculated with respect to a motion vector corresponding to an upward vector. Specifically, a frontality score is calculated according to Equation 5. A frontality value with a high positive value is calculated with respect to a motion vector with a high correlation to a downward vector. In contrast, a frontality score with a high negative value is calculated with respect to a motion vector with a high correlation to an upward vector. Herein, a downward direction is defined as a positive direction of a y-axis.

$$S_m = \frac{1}{\sqrt{V_x^2 + V_y^2}} \begin{pmatrix} V_x \\ V_y \end{pmatrix} \cdot \begin{pmatrix} 0 \\ 1 \end{pmatrix} = \frac{V_y}{\sqrt{V_x^2 + V_y^2}} \qquad \text{[Equation 5]}$$

Herein, it is possible to calculate a frontality score in consideration of scalar quantity of motion vector. When scalar quantity of motion vector is equal to or less than a threshold, Equation 5 may produce a frontality score of "0".

Additionally, it is possible to calculate a frontality score based on clothing symmetry. That is, when the clothing symmetry determination part 320 provides clothing symmetry using $D_s$ with bar and $D_f$ with bar, it is possible to calculate a frontality score according to Equation 6.

$$S_c = g(\overline{D_f}) s(\overline{D_s}) \qquad \text{[Equation 6]}$$

Herein, g(x) denotes a monotone nondecreasing function, while s(x) denotes a monotone nonincreasing function which produces "0" when x is a large number. Alternatively, when the clothing symmetry determination part 320 provides clothing symmetry using $D_s(y)$ and $D_f(y)$, it is possible to calculate a frontality score according to Equation 7.

$$S_c = s\left(\frac{1}{Y_1 - Y_0} \sum_{y=Y_0}^{Y_1} g(D_f(y)) D_s(y)\right) \qquad \text{[Equation 7]}$$

As described above, it is possible to determine a person's direction based on frontality scores which are calculated with respect to a person's face direction, person's motion, and clothing symmetry. Herein, it is necessary to calculate the sum or product of frontality scores, thus determining that a person is currently turning in a front direction when the sum/product is higher than a predetermined threshold. Alternatively, it is possible to create an identification system such as a neural network, which inputs frontality scores so as to output a determination result regarding integrative frontality, by use of a learning function of input data, thus determining person's frontality. Herein, a person's direction is determined by classifying it into a front direction, a rear direction, and an indeterminable direction.

Figure 7:
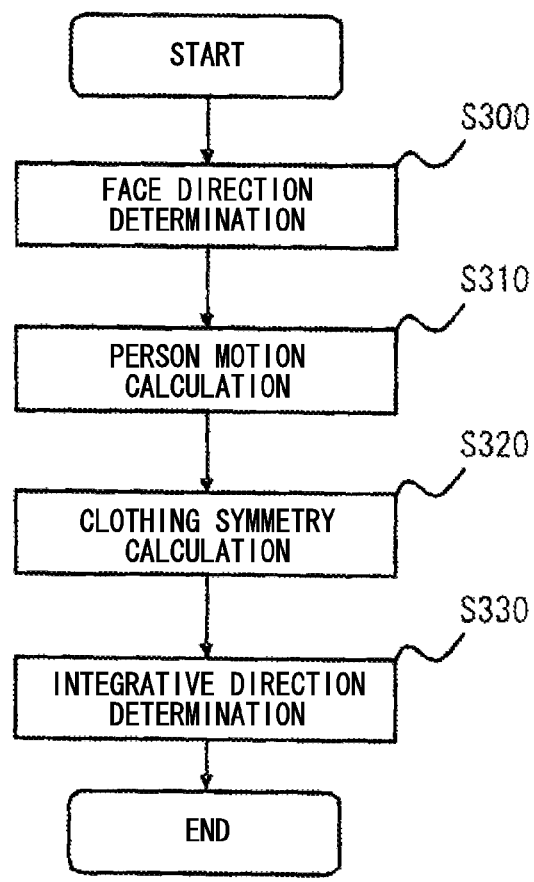
FIG. 7 A flowchart showing the processing of the person direction determination part.

Next, the entire process of the person direction determination part 110 shown in FIG. 3 will be described with reference to a flowchart shown in FIG. 7. First, the face direction determination part 300 determines a face direction so as to forward its determination result to the integrative direction determination part 330 (step S300). Next, the person motion analysis part 310 estimates movement of a person's region so as to forward its estimation result to the integrative direction determination part 330 (step S310). Next, the clothing symmetry determination part 320 determines person's clothing symmetry so as to forward its determination result to the integrative direction determination part 330 (step S320). Thereafter, the integrative direction determination part 330 determines a person's integrative direction based on a person's face direction, person's motion, and clothing symmetry (step S330). In this connection, it is possible to change the order of steps S300, S310, and S320.

Figure 4:
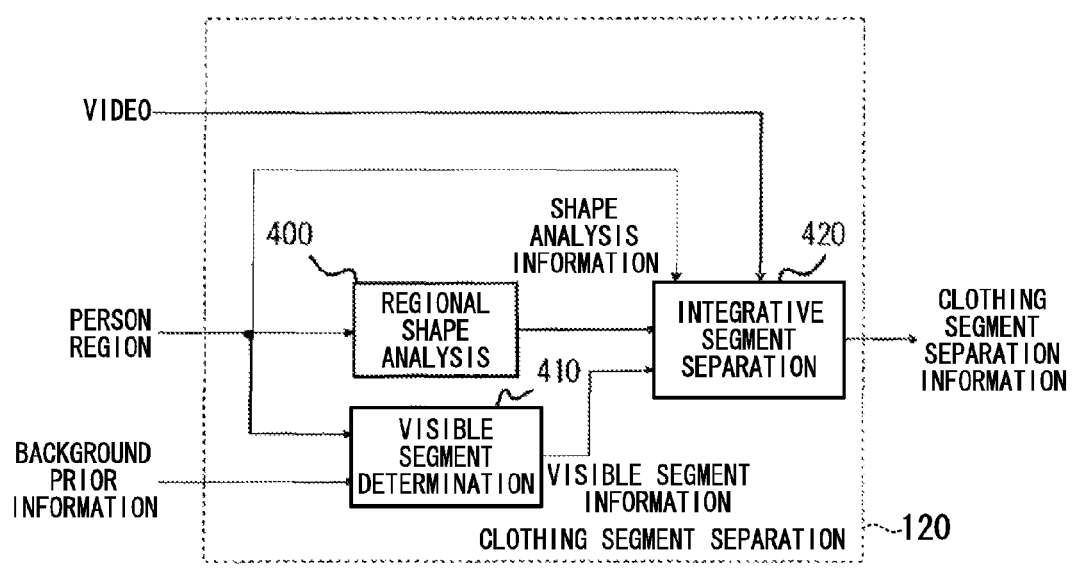
FIG. 4 A block diagram showing the internal constitution of a clothing segment separation part.

Next, the clothing segment separation part 120 of the person clothing feature extraction device shown in FIG. 1 will be described in detail. FIG. 4 is a block diagram showing the internal constitution of the clothing segment separation part 120. The clothing segment separation part 120 includes a regional shape analysis part 400, a visible segment determination part 410, and an integrative segment separation part 420.

The regional shape analysis part 400 analyzes a person's region so as to generate shape analysis information and forward it to the integrative segment separation part 420. The visible segment determination part 410 generates visible segment information based on a person's region and background prior information so as to forward it to the integrative segment separation part 420. The integrated segment separation part 420 generates clothing segment separation information based on input video, the shape analysis information of the regional shape determination part 400, and the visible segment information of the visible segment determination part 410.

Next, the process of the clothing segment separation part 120 shown in FIG. 4 will be described. The following description presumes two segments, i.e. the upper part and the lower part of a body, as clothing segments so that clothing segment separation information is generated as information for separating them. The regional shape analysis part 400 analyzes a geometrical shape of a person's region so as to generate shape analysis information for determining whether or not a person is currently standing or for determining whether or not the upper part of a person is solely reflected into a viewing scope. For instance, it is possible to presume a rectangular area surrounding a person's region and thereby calculate its aspect ratio, thus generating shape analysis information. The calculated shape analysis information is supplied to the integrative segment separation part 420.

The visible segment determination part 410 determines whether or not a person is separable into the upper part and the lower part of a body based on a person's region and background prior information. Specifically, it determines whether or not a person's entire body is visible in a person's region based on the background prior information located at the coordinates which are calculated with respect to the lower end of a person's region. In the case where the background prior information indicates that a person's entire body is visible, visible segment information representing it is generated. In the case where the background prior information indicates that the upper part (or the lower part) of a person is solely visible in a person's region, visible segment information representing it is generated. In other cases, visible segment information representing indetermination of visible segments is generated. Visible segment information is supplied to the integrative segment separation part 420.

The integrative segment separation part 420 determines whether or not person's clothing segments are separable based on shape analysis information and visible segment information. Specifically, it determines whether or not a person falls within an appropriate range (i.e. an appropriate range inside a viewing scope) based on shape analysis information. For instance, when visible segment information indicates that the entire body of a person who is standing straightly within an appropriate range is visible, the integrative segment separation part 420 determines that a person is separable into the upper part and the lower part of a body. On the other hand, when shape analysis information indicates that the upper part of a person's body solely falls within an appropriate range and when visible segment information indicates that the upper part of a person's body is visible, the integrative segment separation part 420 determines that the upper part of a person's body is solely visible. When visible segment information indicates indetermination of visible segments, the integrative segment separation part 420 determines that a person cannot be separated into the upper part and the lower part of a body. Alternatively, when shape analysis information indicates that a person who is standing straightly does not fall within an appropriate range or when it indicates that the upper part of a person's body does not fall within an appropriate range, the integrative segment separation part 420 determines that a person cannot be separated into the upper part and the lower part of a body.

Upon determining that a person is separable into the upper part and the lower part of a body, the integrative segment separation part 420 calculates its separation position as well. As a method of calculating a separation position, it is possible to propose various methods. For instance, it is possible to scan pixel data of a person's region in a horizontal direction in accordance with Equation 8, thus calculating pixel function values projected in a y-axis direction.

$$f(y) = \frac{\sum_{x=X_0}^{X_1} I(x, y)M(x, y)}{\sum_{x=X_0}^{X_1} M(x, y)}$$ [Equation 8]

Herein, I(x,y) denotes pixel data (i.e. a three-dimensional vector in a color space R, G, B) at coordinates (x,y), while M(x,y) denotes mask information of a person's region. A y-coordinate that greatly varies a pixel function value f(y) of Equation 8 is calculated. For instance, Equation 9 is used to produce a maximum value among differences of pixel function values; hence, it is possible to determine that a person is separable into the upper part and the lower part of a body when a maximum difference $D_0$ is higher than a threshold. When it is determined that a person is separable into the upper part and the lower part of a body, Equation 10 is used to calculate a y-coordinate value $y_0$ at this state. As described above, the integrative segment separation part 420 stores the y-coordinate value $y_0$ at the foregoing state, in addition to the determination result that a person is separable into the upper part and the lower part of a body, in clothing segment separation information.

$$D_0 = \max_v \left( \sum_{y=1}^{B} f(v-y) - \sum_{y=1}^{B} f(v+y) \right)$$ [Equation 9]

$$y_0 = \operatorname{argmax}_v \left( \sum_{y=1}^{B} f(v-y) - \sum_{y=1}^{B} f(v+y) \right)$$ [Equation 10]

In this connection, when a relatively small difference is found among visual features between the upper part and the lower part of person's clothes, it is determined that a person's region is separable with a predetermined separation ratio, so that the separation ratio is stored in clothing segment separation information.

Figure 8:
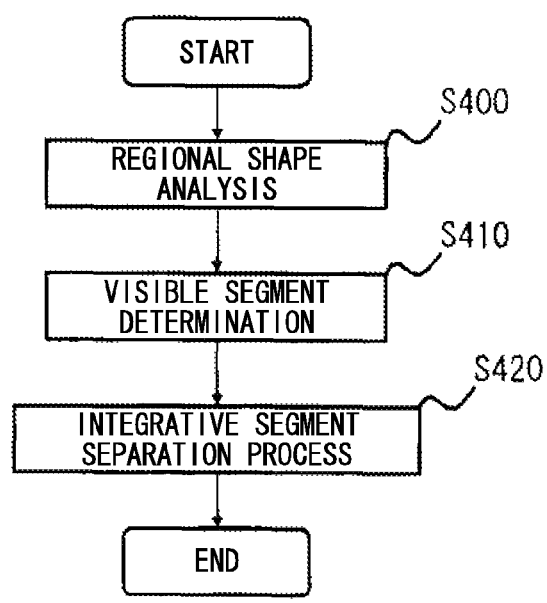
FIG. 8 A flowchart showing the processing of the clothing segment separation part.

Next, the process of the clothing segment separation part 120 shown in FIG. 4 will be described with reference to a flowchart shown in FIG. 8. First, the regional shape analysis part 400 analyzes the shape of a person's region so as to forward shape analysis information to the integrative segment separation part 420 (step S400). Next, the visible segment determination part 410 determines visible segments, which are visible in a viewing scope of a camera, based on a person's region and background prior information, thus providing visible segment information to the integrative segment separation part 420 (step S410). The integrative segment separation part 420 executes the foregoing integrative segment separation process so as to generate clothing segment separation information (step S420). In this connection, it is possible to change the order of steps S400 and S410.

Figure 2:
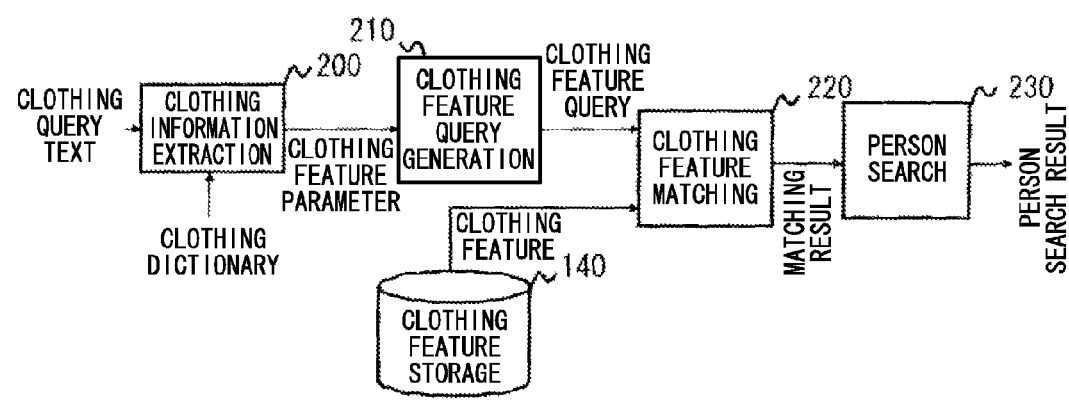
FIG. 2 A block diagram showing the constitution of a person search device according to an embodiment of the present invention.

Next, a person search device according to an embodiment of the present invention will be described in detail. FIG. 2 is a block diagram showing the constitution of the person search device according to the present embodiment. The person search device includes a clothing information extraction part 200, a clothing feature query generation part 210, a clothing feature matching part 220, and a person search part 230 as well as the clothing feature storage 140. The person search device shown in FIG. 2 does not include constituent elements of the person clothing feature extraction device except for the clothing feature storage 140 shown in FIG. 1. However, it is possible to combine the person search device of FIG. 2 with the person clothing feature extraction device of FIG. 1.

The functionality of the person search device is realized by installing a person search program in a computer which is configured of a CPU, a ROM, and a RAM.

The clothing information extraction part 200 extracts words representing types of clothes and visual features based on clothing query texts, thus producing clothing feature parameters. Specifically, it analyzes a clothing query text with reference to a clothing dictionary, thus producing and providing clothing feature parameters to the clothing feature query generation part 210. The clothing feature query generation part 210 estimates clothing visual features based on clothing feature parameters, thus producing and providing a clothing feature query to the clothing feature matching part 220. The clothing feature storage 140 stores person's clothing features which are extracted by means of the person clothing feature extraction part shown in FIG. 1. Clothing features are visual features regarding person's clothes which are generated based on input video, a person's region, and clothing segment separation information. It is possible to additionally include visual featured regarding clothes, which are extracted based on a person's direction, in clothing features. The clothing feature matching part 220 compares a clothing feature query with clothing features stored in the clothing feature storage 140, thus providing its matching result to the person search part 230. The person search part 230 integrates matching results produced by the clothing feature matching part 220, thus producing a person search result.

Next, the operation of the person search device shown in FIG. 2 will be described in detail. The clothing information extraction part 200 extracts clothing feature parameters, representing types and colors of clothes, with reference to a clothing dictionary based on a clothing query text. The clothing dictionary stores clothing information, i.e. pixel data (e.g. RGB data or HSV data), in connection with words representing various colors. Additionally, the clothing dictionary may include information, as to whether types of clothes are related to the upper part or the lower part of a body, in clothing information. The clothing information extraction part 200 analyzes a clothing query text with reference to clothing information, which is registered with the clothing dictionary, thus generating clothing feature parameters.

Upon receiving a clothing query text representing "a white shirt, a blue jacket, and black trousers", for example, the clothing information extraction part 200 extracts from the clothing dictionary the clothing information that "shirt" and "jacket" are related to the upper part of a body while they are colored "white" and "blue" respectively. Additionally, the clothing information extraction part 200 extracts from the clothing dictionary the clothing information that "trousers" are related to the lower part of a body while it is colored "black". Furthermore, the clothing information extraction part 200 determines that, when a shirt and a jacket are simultaneously worn by a person, the jacket appears in the front layer of wearing so that "blue" has a higher ratio than "white" as the total color of the upper part of a body. Considering a fact that both the shirt and the jacket are visible through observation of a person in his/her front direction whilst the jacket is solely visible through observation of a person in his/her rear direction, the clothing information extraction part 200 generates different color parameters with respect to the front side and the rear side in the upper part of a body. As to the lower part of a body, it generates a color parameter indicating that both the front side and the rear side are colored "black".

When a clothing query text includes a language representing ambiguity such as "roughly . . . " and "a sort of . . . " in Japanese, it is necessary to describe a degree of ambiguity in a clothing feature parameter. When clothing features are displayed using a color histogram, for example, it is possible to adjust a spreading factor of the color histogram with a degree of ambiguity.

As described above, pixel data (e.g. RGB data or HSV data) regarding the upper part and the lower part of a body, the color ratio, the color parameter, and the degree of ambiguity in color rendition are described in clothing feature parameters, which are supplied to the clothing feature query generation part 210.

The clothing feature query generation part 210 generates a clothing feature query based on clothing feature parameters provided from the clothing information extraction part 200. When a color histogram is used to represent clothing features, for example, it is necessary to create a color histogram with a peak value corresponding to pixel data included in clothing feature parameters, and a spreading factor dependent upon a degree of ambiguity in color rendition. Herein, the peak value of a color histogram is adjusted in response to the color ratio. Additionally, it is necessary to create color histograms individually with respect to a front direction and a non-front direction of a person because a manner how colors of clothes are viewed depends on a person's direction (i.e. a decision whether or not a person is turning in his/her front direction). Furthermore, it is necessary to create clothing feature queries with respect to the upper part and the lower part of a body. Clothing feature queries, which are created as described above, are supplied to the clothing feature matching part 220.

The clothing feature matching part 220 compares a clothing feature query, which is generated by the clothing feature query generation part 210, with clothing features (i.e. clothing features of a person currently subjected to searching) stored in the clothing feature storage 140, thus calculating matching scores. Comparison between a clothing feature query and clothing features (which are retrieved from the clothing feature storage 140) can be carried out with respect to each of clothing segments specified by clothing segment separation information.

The foregoing matching scores represent similarities of clothing features; for example, they can be calculated using the scalar product of clothing feature vectors. Alternatively, it is possible to calculate distances (or differences) between clothing features and subsequently convert them into similarities of clothing features. That is, a distance d between clothing features is converted into a similarity S in accordance with Equation 11.

$$S = \frac{1}{1+d} \qquad [\text{Equation 11}]$$

Since clothing features stored in the clothing feature storage 140 are stored in connection with a person's direction and clothing segment separation information, the clothing feature matching part 220 considers its information to compare a clothing feature query with retrieved clothing features. Specifically, when retrieved clothing features are correlated to front sides of persons, they should be compared with a clothing feature query pertaining to the front side of a person. When retrieved clothing features are correlated to non-front directions of persons, they should be compared with a clothing feature query pertaining to a non-front direction of a person. When retrieved clothing features are correlated to indeterminable directions of persons, they should be compared with both the clothing feature queries pertaining to a front direction and a non-front direction of a person, so that a better matching result will be selected.

When retrieved clothing features are correlated to the upper parts of persons, they should be compared with a clothing feature query pertaining to the upper part of a person's body in consideration of clothing segment separation information. When retrieved clothing features are correlated to the lower parts of persons, they should be compared with a clothing feature query pertaining to the lower part of a person's body. On the other hand, when person's clothes cannot be separated into the upper part and the lower part of a person's body, it is necessary to compare them with an integrative clothing feature query which is created by integrating clothing feature queries pertaining to the upper part and the lower part of a person's body. When a color histogram is used to represent clothing features, for example, clothing features pertaining to the upper part and the lower part of a person's body are added together, normalized as necessary, and then compared to retrieved clothing features.

When the upper part and the lower part of a person's body are concurrently visible, the clothing feature matching part 220 is able to concurrently produce matching results with respect to both the upper part and the lower part of a person's body. In this case, it is possible to determine a matching degree by using both the matching results of clothing features pertaining to the upper part and the lower part of a person's body. When one of the upper part and the lower part of a person's body is visible, or when person's clothes cannot be separated into the upper part and the lower part of a person's body, the clothing feature matching part 220 may solely produce one matching result. In this case, it is necessary to determine a matching degree by using one matching result.

As described above, the clothing feature matching part 220 generates different numbers of matching results depending on a manner how a person is visible. When one matching result is produced, a similarity of clothing features at this state is directly used as an entire matching result. When a plurality of matching results pertaining to the upper part and the lower part of a person's body or the like is produced, it is possible to calculate a plurality of similarities $S_1$, $S_2$ regarding clothing features. In this case, it is necessary to calculate an integrative similarity S according to Equation 12.

$$S=h(S_1+S_s)$$

Herein, h(x) denotes a monotone nondecreasing function, for example, which is expressed via Equation 12.

$$h(s)=\sqrt{s} \qquad \text{[Equation 13]}$$

Owing to the foregoing processes, it is possible to produce matching results, which are close to person's clothing features by intuition, by increasing similarities which are calculated via integrative matching. Matching results of the clothing feature matching part 220 are supplied to the person search part 230.

The person search part 230 produces person search results based on matching results of the clothing feature matching part 220. Specifically, matching results are sorted in a descending order of integrative similarities so that they are provided as person search results. When the number of matching results included in a person search result is fixed to N, it is necessary to selectively provide N matching results in upper places in the descending order of integrative similarities.

Figure 9:
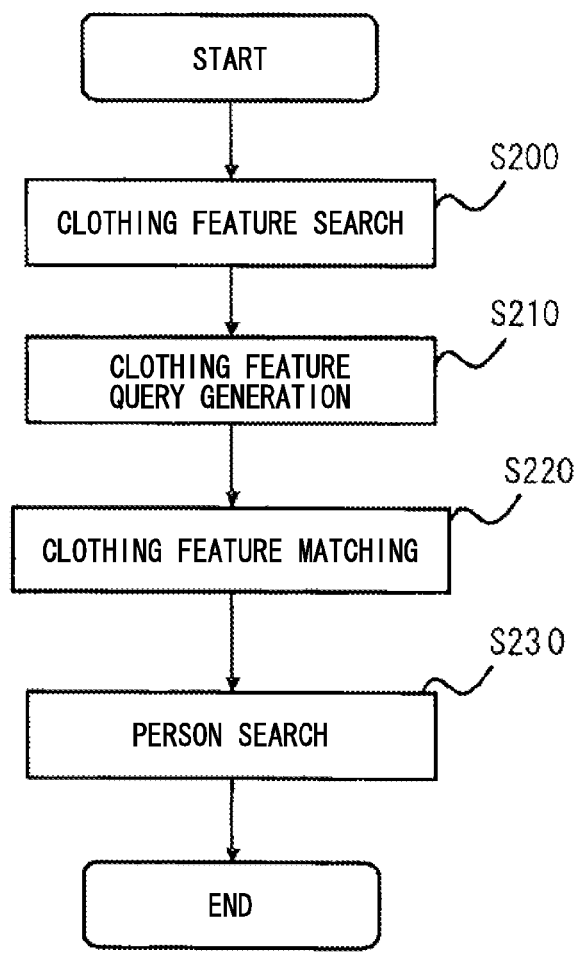
FIG. 9 A flowchart showing the processing of the person search device.
Figure 10:
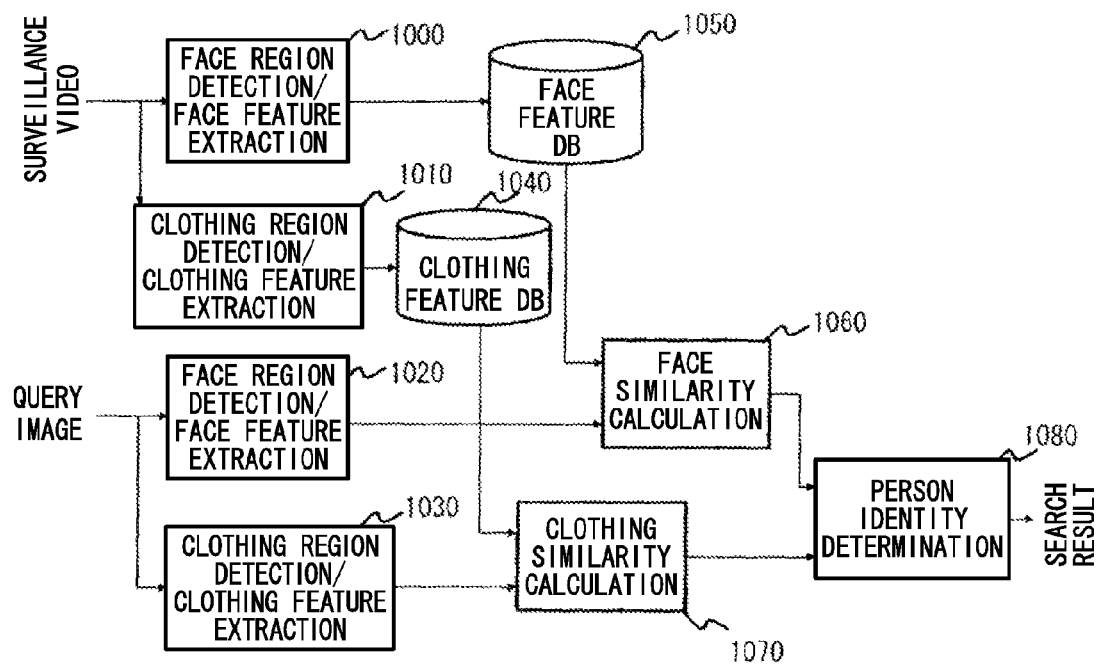
FIG. 10 A block diagram showing the constitution of a conventional person search system.

Next, the operation of the person search device shown in FIG. 2 will be described in detail with reference to a flowchart shown in FIG. 9. First, the clothing information extraction part 200 extracts clothing feature parameters, corresponding to a clothing query text, with the clothing dictionary, thus forwarding them to the clothing feature query generation part 210 (step S200). Next, the clothing feature query generation part 210 generates a clothing feature query based on clothing feature parameters, thus forwarding it to the clothing feature matching part 220 (step S210). Next, the clothing feature matching part 220 compares a clothing feature query with retrieved clothing features (read from the clothing feature storage 140), thus forwarding its matching result to the person search part 230 (step S220). The person search part 230 produces and forwards a person search result based on a clothing feature query and retrieved clothing features (step S230).

The person search device shown in FIG. 2 achieves high-level person search processing based on a clothing query text, which is expressed using natural languages such as Japanese and English, in consideration of a person's direction and clothing segment separation information. In other words, the present embodiment is designed to input clothing features of persons expressed in natural languages so as to search for persons in consideration of differences of persons' directions and clothing features; hence, it is possible to produce person search results close to searcher's intention.

In this connection, the present invention is not necessarily limited to the foregoing embodiment so that it allows for any changes within the scope of the invention defined by the appended claims. For instance, the clothing feature separation part 120 does not necessarily separate person's clothing segments into two parts, i.e. the upper part and the lower part of a body, but it may separate them into other clothing segments such as shoes and hats.

INDUSTRIAL APPLICABILITY

The present invention is designed to detect a person's region within the viewing scope of a surveillance camera, extract person's clothing features included in the person's region, and thereby search for a person with a high accuracy with reference to a database; hence, the present invention is applicable to security usages in public organizations and private companies.

REFERENCE SIGNS LIST 100 person region detection part
110 person direction determination part
120 clothing segment separation part
130 clothing feature extraction part
140 clothing feature storage
200 clothing information extraction part
210 clothing feature query generation part
220 clothing feature matching part
230 person search part
300 face direction determination part
310 person motion analysis part
320 clothing feature symmetry determination part
330 integrative direction determination part
400 regional shape analysis part
410 visible segment determination part
420 integrative segment separation part
1000 face region detection/face feature extraction part
1010 clothing region detection/clothing feature extraction part
1020 face region detection/face feature extraction part
1030 clothing region detection/clothing feature extraction part
1040 clothing feature database (DB)
1050 face feature database (DB)
1060 face similarity calculation part 1070 clothing similarity calculation part
1080 person identity determination part

The invention claimed is:

1. A person clothing feature extraction device using a processor and a clothing feature storage configured to store clothing features based on an input video, the person clothing feature extraction device comprising:

a person region detection part configured to automatically detect a person's region from the input video by performing a person detection image processing operation;

a person direction determination part configured to automatically determine a person's direction of the person's region by performing an image processing operation;

a clothing segment separation part configured to automatically determine a separability of person's clothes in the person's region based on shape analysis of the person's region and the position of the person's region using background prior information indicating a part of a person is visible, and configured to automatically produce clothing segment separation information including information whether or not the person's region can be separated into segment regions and information describing segment regions from which clothing features are to be extracted; and a clothing feature extraction part configured to extract the clothing features representing visual features of person's clothes from the segment regions of the person's region defined by the clothing segment separation information as clothing features corresponding to the person's direction, thus storing the clothing features in the clothing feature storage.

2. The person clothing feature extraction device according to claim 1, wherein the person direction determination part determines the person's direction based on a person's face direction, a person's motion, or a clothing symmetry obtained by performing image processing on the person's region.

3. The person clothing feature extraction device according to claim 1, wherein the person's direction determined by the person direction determination part indicates a front direction, a rear direction, or an indeterminable direction.

4. The person clothing feature extraction device according to claim 1, wherein the clothing segment separation part includes a regional shape analysis part configured to analyze a geometric shape of the person's region to determine whether or not the person's region corresponds to a standing person and produce shape analysis information, a visible segment determination part configured to produce visible segment information representing person's clothing segments visualized by calculating the coordinates of the lower end of the person's region and comparing the calculated coordinates with the background prior information, and an integrative segment separation part configured to determine the separability of person's clothing segments based on the shape analysis information and the visible segment information so as to produce the clothing segment separation information.

5. A person clothing feature extraction method implemented by a processor and a clothing feature storage configured to store clothing features based on an input video, the person clothing feature extraction method comprising:

detecting, by the processor, a person's region from the input video;

determining, by the processor, a person's direction of the person's region;

determining, by the processor, a separability of person's clothes in the person's region based on shape analysis of the person's region and the position of the person's region using background prior information indicating a part of a person is visible, and using the determined separability to automatically produce clothing segment separation information including information whether or not the person's region can be separated into segment regions and information describing segment regions from which clothing features are to be extracted; and extracting, by the processor, the clothing features representing visual features of person's clothes from the segment regions of the person's region defined by the clothing segment separation information as clothing features corresponding to the person's direction, thus storing the clothing features in the clothing feature storage.

6. The person clothing feature extraction method according to claim 5, wherein the person's direction is determined based on a person's face direction, a person's motion, or a clothing symmetry.

7. The person clothing feature extraction method according to claim 5, wherein the person's direction indicates a front direction, a rear direction, or an indeterminable direction.

8. The person clothing feature extraction method according to claim 5, further comprising:

analyzing a geometric shape of the person's region to determine whether or not the person's region corresponds to a standing person and produce shape analysis information;

producing visible segment information representing person's clothing segments which are visualized by calculating the coordinates of the lower end of the person's region and comparing the calculated coordinates with the background prior information; and determining the separability of person's clothing segments based on the shape analysis information and the visible segment information so as to produce the clothing segment separation information.

9. A non-transitory computer readable medium storing a program implementing the clothing feature extraction method as defined in claim 5 in a computer-readable/executable format.

* * * * *